United States Patent
Nakagawa

(10) Patent No.: US 8,060,894 B2
(45) Date of Patent: Nov. 15, 2011

(54) DISK DEVICE HAVING DISK TRAY

(75) Inventor: Yoshiyuki Nakagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 679 days.

(21) Appl. No.: 12/178,737

(22) Filed: Jul. 24, 2008

(65) Prior Publication Data

US 2009/0037942 A1   Feb. 5, 2009

(30) Foreign Application Priority Data

Jul. 30, 2007  (JP) .................................. 2007-197074

(51) Int. Cl.
*G11B 17/04* (2006.01)

(52) U.S. Cl. ........................................................ 720/602

(58) Field of Classification Search .................. 720/601, 720/602, 661
See application file for complete search history.

(56) References Cited

U.S. PATENT DOCUMENTS

| | | | | |
|---|---|---|---|---|
| 5,473,593 A * | 12/1995 | Wheeler | | 720/608 |
| 6,005,833 A * | 12/1999 | Yasuma et al. | | 720/602 |
| 6,016,299 A * | 1/2000 | Ishige | | 720/621 |
| 6,789,260 B2 * | 9/2004 | Shiomi | | 720/607 |
| 6,981,269 B2 * | 12/2005 | Minase | | 720/602 |
| 7,287,263 B2 * | 10/2007 | Abe | | 720/661 |
| 7,341,339 B2 * | 3/2008 | Yoshikaie | | 347/104 |
| 7,386,866 B2 * | 6/2008 | De Hoog et al. | | 720/602 |
| 7,610,590 B2 * | 10/2009 | Nasu et al. | | 720/608 |
| 7,614,061 B2 * | 11/2009 | Ko | | 720/602 |
| 7,814,508 B2 * | 10/2010 | Fujisawa | | 720/713 |
| 2005/0188390 A1 * | 8/2005 | Kuo et al. | | 720/621 |
| 2005/0204373 A1 | 9/2005 | Ueno et al. | | |
| 2009/0037942 A1 * | 2/2009 | Nakagawa | | 720/601 |
| 2010/0146524 A1 * | 6/2010 | Loh et al. | | 720/601 |

FOREIGN PATENT DOCUMENTS

| JP | 2000-306308 A | 11/2000 |
|---|---|---|
| KR | 10-0712335 B1 | 4/2007 |

OTHER PUBLICATIONS

European Search Report of corresponding EP Application No. 08 01 3538.7 dated Jul. 20, 2011.

* cited by examiner

*Primary Examiner* — Brian Miller

(74) *Attorney, Agent, or Firm* — Global IP Counselors, LLP

(57) ABSTRACT

A disk device includes a disk tray, a spindle motor, a chucking section, a loading motor, a tray-in switch, a tray-out switch and a loading motor drive voltage generating section. The loading motor drive voltage generating section generates a drive voltage for the loading motor so that a torque of the loading motor is gradually increased after the tray-out switch detects that the disk tray is not located at a predetermined range between an eject position and a retract position until the tray-in switch detects that the disk tray is located at the retract position.

13 Claims, 9 Drawing Sheets

DISK DEVICE HAVING DISK TRAY

CROSS-REFERENCE TO RELATED APPLICATIONS

This application claims priority to Japanese Patent Application No. 2007-197074 filed on Jul. 30, 2007. The entire disclosure of Japanese Patent Application No. 2007-197074 is hereby incorporated herein by reference.

BACKGROUND OF THE INVENTION

1. Field of the Invention

The present invention generally relates to a disk device. More specifically, the present invention relates to a disc device with which data recorded on a disk recording medium is reproduced.

2. Background Information

A conventional disk device records and reproduces CD's, DVD's, and other such optical disks. The disk device includes a disk tray and a loading mechanism. An optical disk is placed on the disk tray. The loading mechanism loads and unloads the disk tray to carry the optical disk. Loading refers to an operation of retracting the disk tray into the disk device. Unloading refers to an operation of extracting (or ejecting) the disk tray from the disk device. The disk device also includes a tray-in switch and a tray-out switch. The tray-in switch detects whether or not the disk tray is completely in a close position. The tray-out switch detects whether the disk tray is in an open position or in a loading/unloading state.

The disk device also includes a chucking pulley and a disk table. The chucking pulley is suspended from an upper part of a loading position of the optical disk. The disk table is raised to a chucking position and engaged from below in a center hole of the optical disk. Then, the optical disk is raised above the disk tray, at which point the optical disk is magnetically chucked on the disk table by the chucking pulley.

During the unloading of the disk device, first the disk table is lowered integrally with a spindle motor from the chucking position to the chucking release position (e.g., unchucking position) by one of the loading motors of the loading mechanism, which unchucks the optical disk. Specifically, the disk table is pulled downward and away against the magnetic chucking force of the chucking pulley, so that the optical disk is separated from above the disk table. Then, the optical disk is unloaded from the loading position to the unloading position by the disk tray.

A technique related to controlling the loading and unloading operations has been disclosed in Japanese Laid-Open Patent Application Publication No. 2000-306308. With the operations, a high drive voltage that is higher than a normal voltage is applied temporarily to the loading motor for a specific length of time until immediately after the start of unloading. Then, the normal voltage is applied to the loading motor until the unloading is complete. The loading motor is driven at a high torque only under high load during chucking.

With the operations discussed in Japanese Laid-Open Patent Application Publication No. 2000-306308, the system is controlled so that the high drive voltage is applied for the specific length of time to the loading motor only during the chucking operation carried out immediately after the start of unloading. However, a problem remains in that when the high drive voltage is suddenly applied during the chucking operation, the torque of the loading motor also increases, but so too does the operating noise of the loading motor.

In view of the above, it will be apparent to those skilled in the art from this disclosure that there exists a need for an improved disk device. This invention addresses this need in the art as well as other needs, which will become apparent to those skilled in the art from this disclosure.

SUMMARY OF THE INVENTION

The present invention is conceived in light of the above-mentioned problems. One object of the present invention is to provide a disk device with which noise during chucking operation can be reduced.

In accordance with one aspect of the present invention, a disk device includes a disk tray, a spindle motor, a chucking section, a loading motor, a tray-in switch, a tray-out switch and a loading motor drive voltage generating section. A disk recording medium is placed on the disk tray. The spindle motor is configured to rotate the disk recording medium together with a disk table on which the disk recording medium is chucked. The chucking section is configured to selectively chuck and unchuck the disk recording medium with respect to the disk table. The loading motor is configured to move the disk tray between an eject position and a retract position and move the chucking section between a chucking position and an unchucking position. The tray-in switch is configured to detect whether or not the disk tray is located at the retract position. The tray-out switch is configured to detect whether or not the disk tray is located at a predetermined range between the eject position and the retract position. The loading motor drive voltage generating section is configured to generate a drive voltage for the loading motor so that a torque of the loading motor is gradually increased after the tray-out switch detects that the disk tray is not located at the predetermined range between the eject position and the retract position until the tray-in switch detects that the disk tray is located at the retract position.

With the disk device of the present invention, it is possible to provide a disk device with which noise during chucking operation can be reduced.

These and other objects, features, aspects and advantages of the present invention will become apparent to those skilled in the art from the following detailed descriptions, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

A preferred embodiment of the present invention will now be explained with reference to the drawings. It will be apparent to those skilled in the art from this disclosure that the following description of the preferred embodiment of the present invention is provided for illustration only and not for the purpose of limiting the invention as defined by the appended claims and their equivalents.

Figure 1:
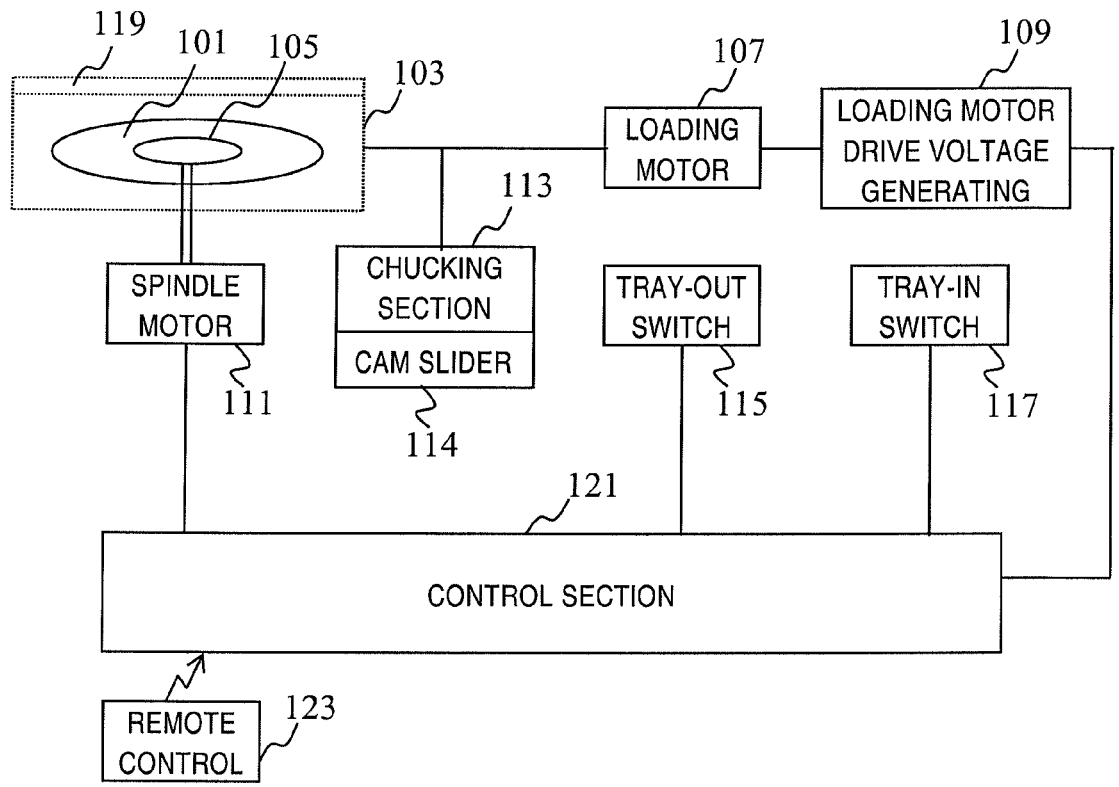
FIG. 1 is a block diagram of a disk device in accordance with one embodiment of the present invention.

FIG. 1 is a block diagram of a disk device. The disk device records and reproduces CD's, DVD's, and other such optical disks. The disk device includes a disk tray 103, a disk table 105, a chucking pulley (not shown), a loading motor 107, a loading motor drive voltage generating section 109, a spindle motor 111, a chucking section 113, a cam slider 114, a tray-out switch 115, a tray-in switch 117, a rib 119 and a control section 121. The disk tray 103 is moved between a close position (e.g., retract position) and an open position (e.g., eject position) by the loading motor 107. An optical disk 101 is placed on the disk tray 103 to load the optical disk 101 within the disk device and unload the optical disk 101 from the disk device. The disk table 105 is mounted to the spindle motor 111. The disk table 105 chucks the optical disk 101 between the disk table 105 and the chucking pulley. The chucking pulley is suspended from an upper part of the disk table 105. The disk table 105 is raised to a chucking position and engaged from below in a center hole of the optical disk 101. Then, the optical disk 101 is raised above the disk tray 103, at which point the optical disk 101 is magnetically chucked between the disk table 105 and the chucking pulley. The loading motor 107 retracts and extracts (e.g., ejects) the disk tray 103. Specifically, the loading motor 107 moves the disk tray 103 between an open position (e.g., eject position) and a close position (e.g., retract position). The loading motor drive voltage generating section 109 generates a drive voltage to drive the loading motor 107. The spindle motor 111 rotates the optical disk 101 together with the disk table 105. The chucking section 113 supports the spindle motor 111 and the disk table 105. The chucking section 113 is moved by the loading motor 107 between a chucking position and an unchucking position. The chucking section 113 grips and fixes the optical disk 101 via the disk table 105 when the chucking section 113 is located at the chucking position. The cam slider 114 is engaged to a part of the chucking section 113 to raise and lower the chucking section 113 together with the disk table 105 and the spindle motor 111. Specifically, the cam slider 114 raises the chucking section 113 to chuck the optical disk 101 and lowers the chucking section 113 to unchuck the optical disk 101. The tray-out switch 115 detects whether or not the disk tray 103 is being loaded or unloaded. Specifically, the tray-out switch 115 detects whether or not the disk tray 103 is located at a predetermined range between the open position and the close position. In particular, the tray-out switch 115 is turned on when the disk tray 103 is located at the predetermined range between the open position and the close position. Thus, the tray-out switch 115 is turned off during a certain period after an ejection (retraction) of the disk tray 103 is commenced from the close position (open position), and during a certain period before the ejection (retraction) of the disk tray 103 is complete. The tray-in switch 117 detects whether or not the disk tray 103 is located at the close position. The rib 119 is provided to the disk tray 103 along a side edge of the disk tray 103 parallel to a direction from the close position to the open position to switch the tray-out switch 115 on and off. The control section 121 controls each of the sections of the disk device. The control section 121 receives tray open and close commands sent from a remote control 123 to open and close the disk tray 103.

Next, unloading and loading operations of the disk tray 103 will be described. The loading operation is an operation that retracts the disk tray into the disk device. The unloading operation is an operation that ejects the disk tray from the disk device. First, the unloading operation will be described. When the tray open command is sent from the remote control 123 to the control section 121, a command to halt a rotation of the spindle motor 111 is sent from the control section 121 in order to stop the rotating of the optical disk 101. Then, the spindle motor 111 is stopped. After this, the control section 121 sends the loading motor drive voltage generating section 109 a command to generate a positive drive voltage for the unloading operation. The positive drive voltage is then applied from the loading motor drive voltage generating section 109 to the loading motor 107 so that a torque of the loading motor 107 gradually increases. Specifically, the loading motor drive voltage generating section 109 generates the positive drive voltage so that the positive drive voltage gradually increases. As a result, the disk tray 103 commences the unloading operation. At the point when the unloading operation has begun and the disk tray 103 has moved slightly towards the open position from the close position, the cam slider 114 that was pressing on the tray-in switch 117 separates from the tray-in switch 117. As a result, the tray-in switch 117 is switched off. Furthermore, an unchucking operation of the optical disk 101 to unchuck the optical disk 101 is commenced by the chucking section 113. The tray-out switch 115 is then switched on by the rib 119 provided to the disk tray 103. Specifically, a front end of the rib 119 pushes the tray-out switch 115. By the time when the tray-out switch 115 is switched on, the unchucking operation is complete. Once the unchucking operation is complete, a first predetermined positive drive voltage V2 (see FIG. 7) is applied to the loading motor 107 to unload the disk tray 103 so that the torque of the loading motor 107 is maintained at a predetermined value (e.g., third predetermined value). Then, the rib 119 provided to the disk tray 103 comes up to a rear end. As a result, the tray-out switch 115 is switched off. When the tray-out switch 115 is switched off, the loading motor drive voltage generating section 109 reduce the first predetermined positive drive voltage V2 to 0V to complete the unloading operation.

The loading operation will now be described. The tray close command is sent from the remote control 123 to the control section 121. Then, a command to generate a negative drive voltage is sent from the control section 121 to the loading motor drive voltage generating section 109. The loading motor drive voltage generating section 109 generates a second predetermined negative drive voltage V3 (see FIG. 7) applied to the loading motor 107 to load the disk tray 103 so that the torque of the loading motor 107 is maintained at a predetermined value (e.g., first predetermined value). Then, the loading operation is commenced. After the loading operation has begun, the second predetermined negative voltage V3 is applied to the loading motor 107 until the tray-out switch 115 is switched off by the front end of the rib 119 after the tray-out switch 115 is switched on by the rear end of the rib 119. Once the tray-out switch 115 has been switched off, the procedures moves to a chucking operation in which the optical disk 101 is clamped (e.g., chucked). First, the second predetermined negative drive voltage V3 that was being applied at a specific level is raised slightly so that the torque of the loading motor 107 is lowered to a predetermined value (e.g., second predetermined value). Then, the negative drive voltage is gradually lowered again so that a torque of the loading motor 107 gradually increases. Then, the disk tray 103 is moved to the close position, and the cam slider 114 switches on the tray-in switch 117. By the time when the disk tray 103 is moved to the close position and the cam slider 114 switches on the tray-in switch 117, the chucking operation is complete. At the same time, the control section 121 halts the command to the loading motor drive voltage generating section 109. As a result, the negative drive voltage applied to the loading motor 107 drops to zero.

Figure 2:
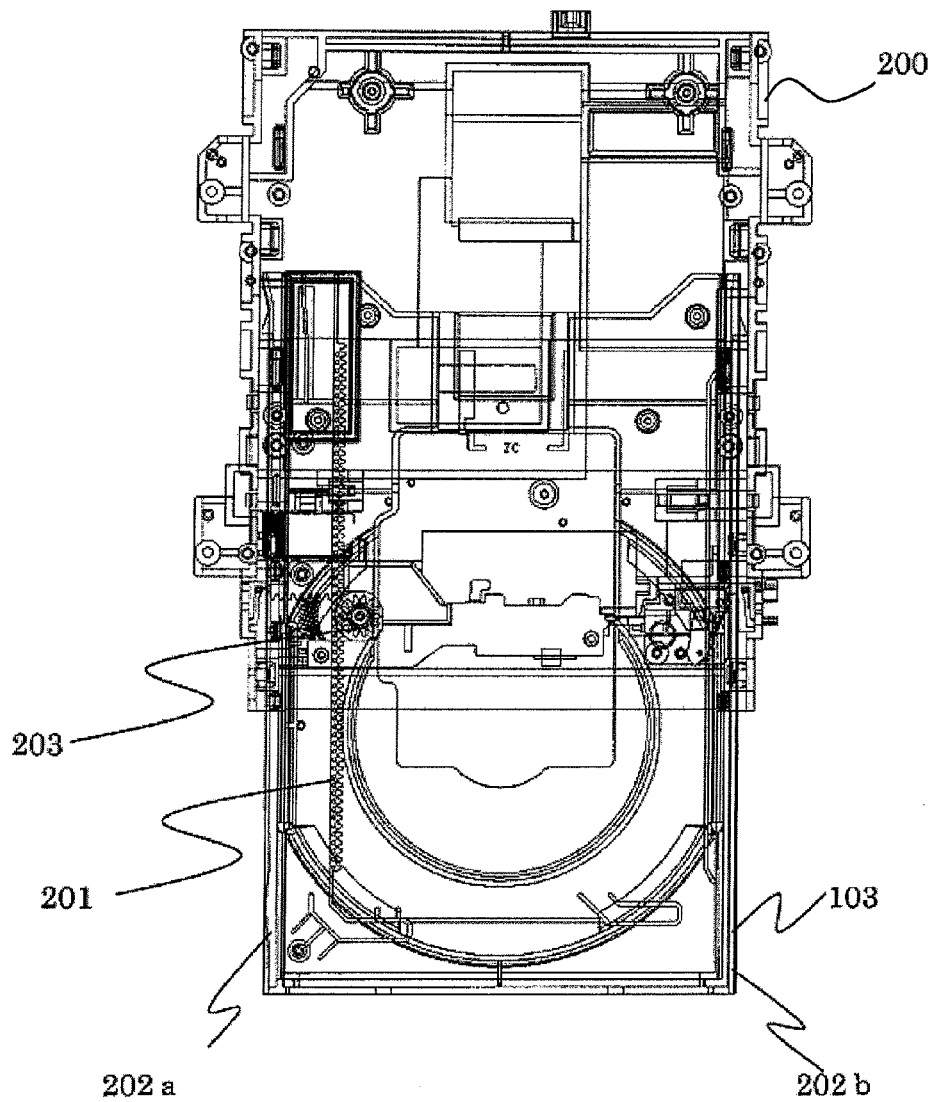
FIG. 2 is a schematic top plan view of the disk device illustrated in FIG. 1.

As shown in FIG. 2, the disk device further includes a loader unit 200. FIG. 2 is a top plan view of an intermediate state between the open and close positions of the disk tray 103. Optical and electrical components for reproducing the optical disk 101 are installed on the loader unit 200. The loader unit 200 retractably and extractably supports the disk tray 103. Also, the loader unit 200 supports the chucking section 113. Specifically, the disk tray 103 includes guide rails 202a and 202b provided to both left and right side edges of the disk tray 103 to guide the movement of the disk tray 103 with respect to the loader unit 200. During the loading and unloading operations, a drive force from the loading motor 107 are transmitted to the disk tray 103 via a tray gear 203 linked to the loading motor 107 and a rack 201 provided to a left side potion of the disk tray 103 that meshes with the tray gear 203.

Figure 3A:
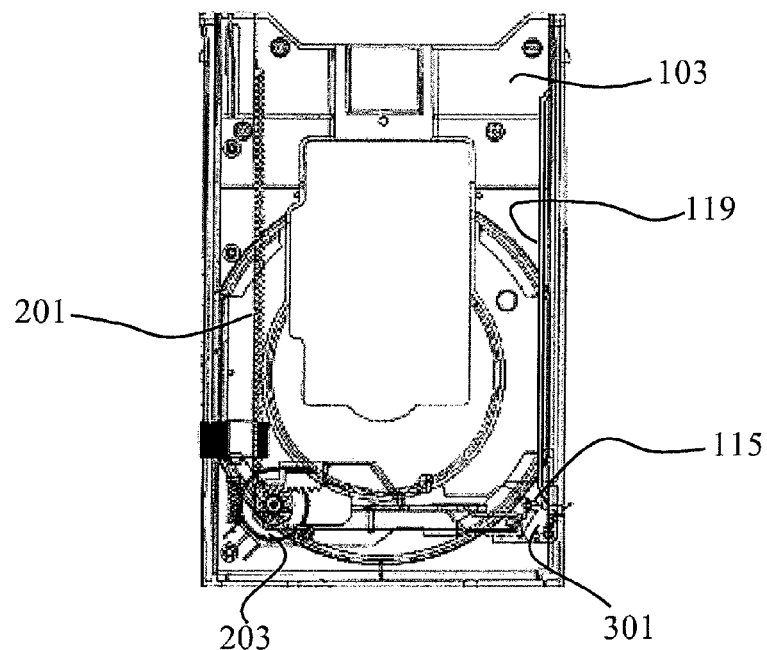
FIG. 3A is a schematic top plan view of the disk device illustrating a closed state of a disk tray of the disk device.
Figure 3B:
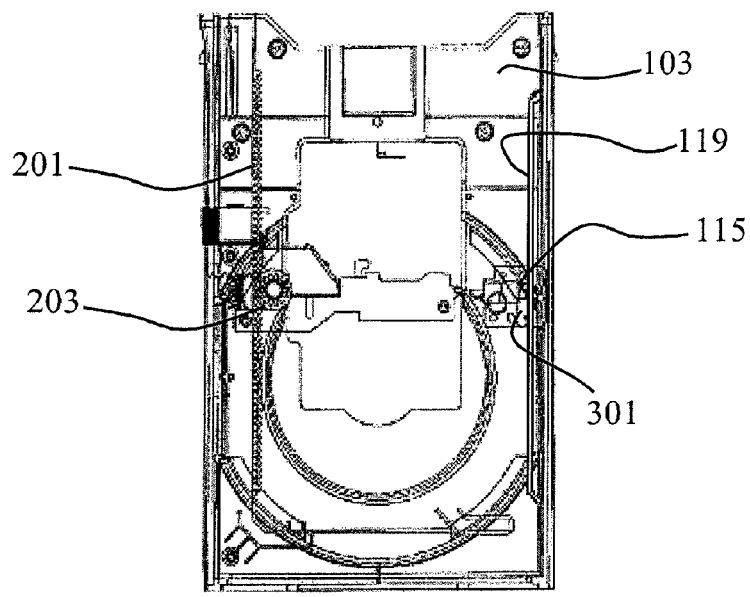
FIG. 3B is a schematic top plan view of the disk device illustrating an unloading state of the disk tray of the disk device.
Figure 3C:
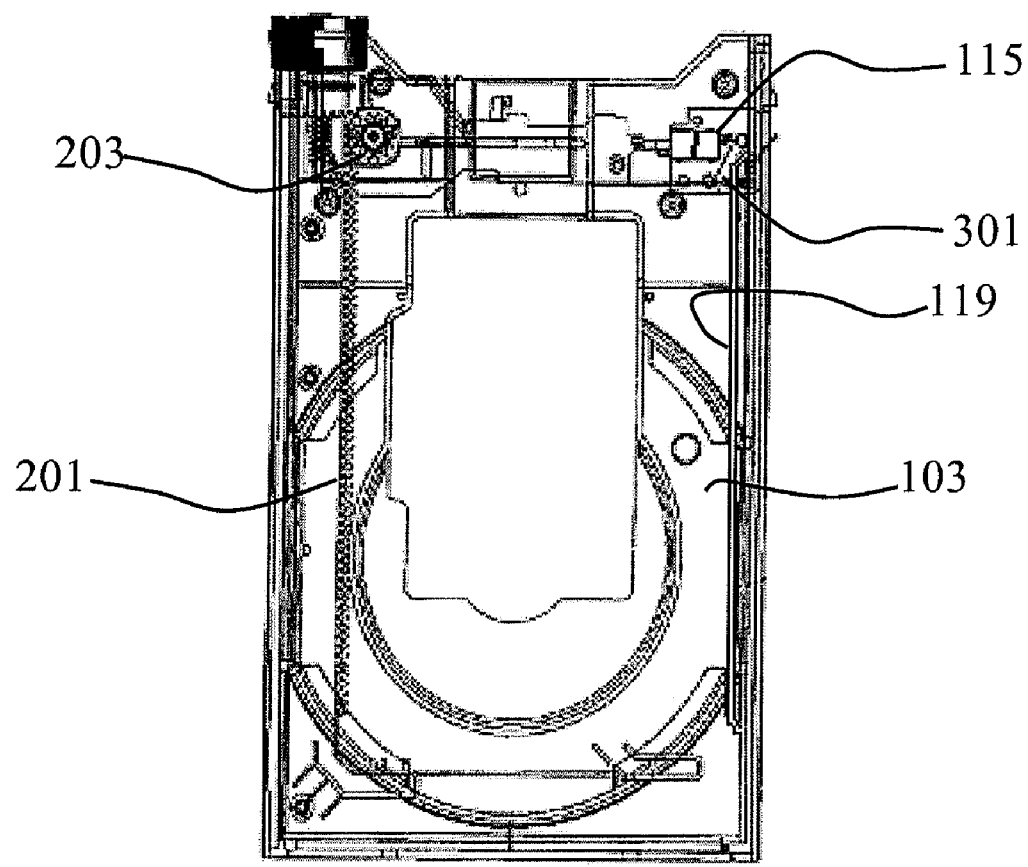
FIG. 3C is a schematic top plan view of the disk device illustrating an open state of the disk tray of the disk device.

The switching operation of the tray-out switch 115 will be described through reference to FIGS. 3A to 3C. First, FIG. 3A shows the close position of the disk tray 103. The tray-out switch 115 is located at a right side with respect to the disk tray 103. The rib 119 is not extended to a front end of the disk tray 103. Thus, when the disk tray 103 is located at the close position, the tray-out switch 115 is not pressed (e.g., is released) by the rib 119, and the tray-out switch 115 is in an off state. When the unloading operation is commenced from this state, the tray gear 203 is rotated by the drive force from the loading motor 107. Then, the disk tray 103 is extracted by the rack 201 as shown in FIG. 3B. When the disk tray 103 is extracted, the rib 119 provided to the disk tray 103 presses against a lever switch 301, and the lever switch 301 presses against the tray-out switch 115. As a result, the tray-out switch 115 turns in an on state. The unloading operation continues until the disk tray 103 is completely extracted (in the open position) as shown in FIG. 3C. The rib 119 is not extended to a rear end of the disk tray 103. Thus, when the disk tray 103 is completely extracted, the rib 119 does not press against the tray-out switch 115. Thus, the tray-out switch 115 turns in the off state.

Figure 4A:
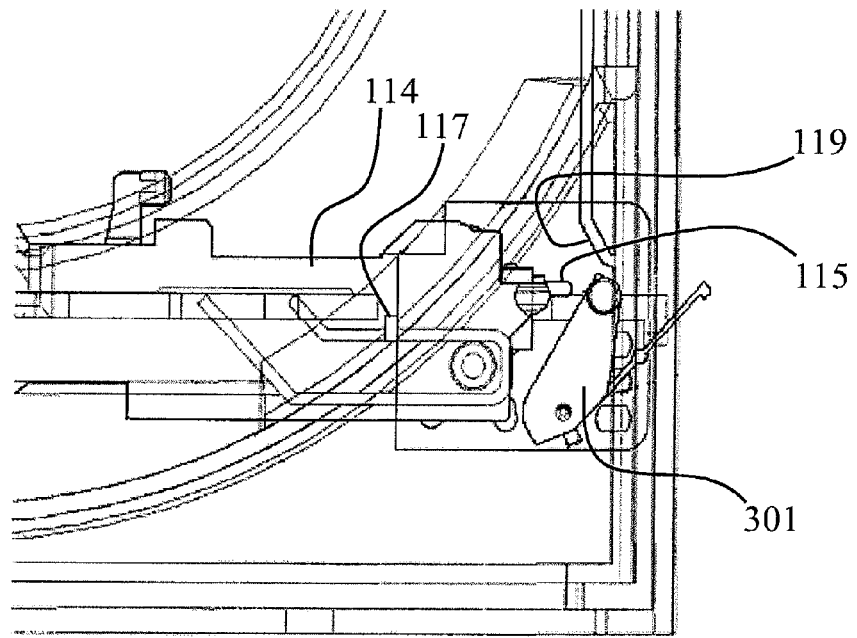
FIG. 4A is a partial top plan view of the disk device illustrating an off state of a tray-in switch of the disk device.
Figure 4B:
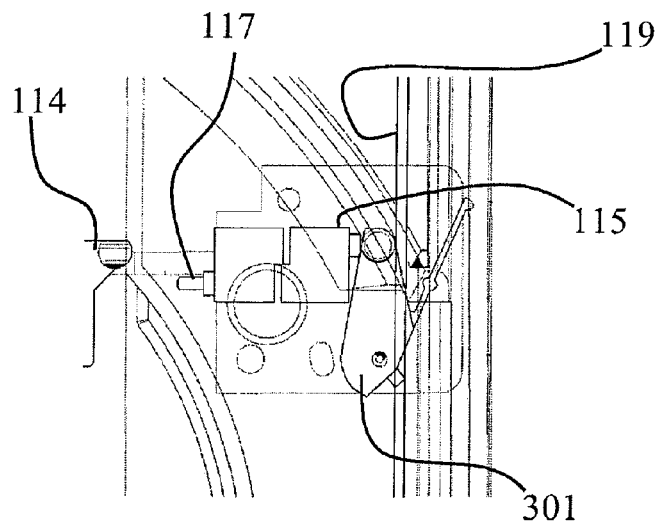
FIG. 4B is a partial top plan view of the disk device illustrating an on state of the tray-in switch of the disk device.

The switching operation of the tray-in switch 117 will be described through reference to FIGS. 4A and 4B. When the disk tray 103 is located at the close position as shown in FIG. 4A, the tray-in switch 117 is pressed by a cam slider 114. Then, the tray-in switch 117 turns in an on state. FIG. 4B shows a state in which the disk tray 103 has been unloaded. When the disk tray 103 is extracted even a little, the cam slider 114 moves to the left with respect to the tray-in switch 117. As a result, the cam slider 114 no longer presses on the tray-in switch 117. Then, the tray-in switch 117 turns in an off state.

Figure 5A:
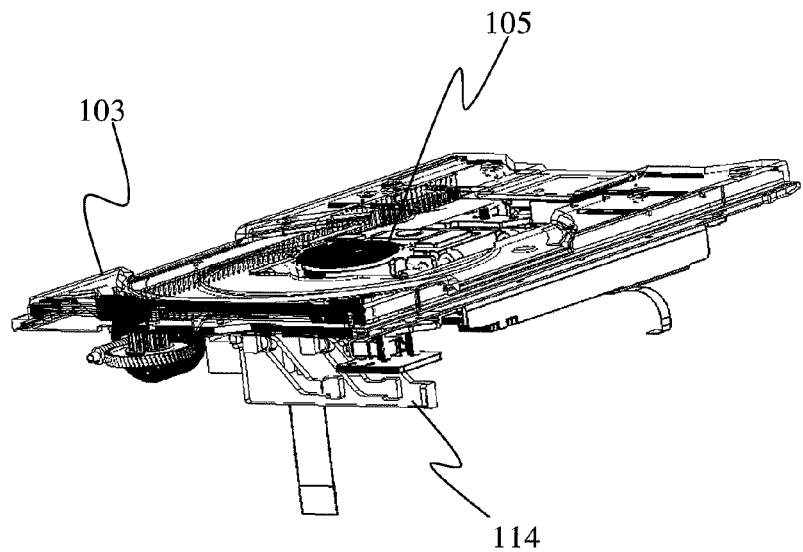
FIG. 5A is a perspective view of the disk device illustrating a chucking operation.
Figure 5B:
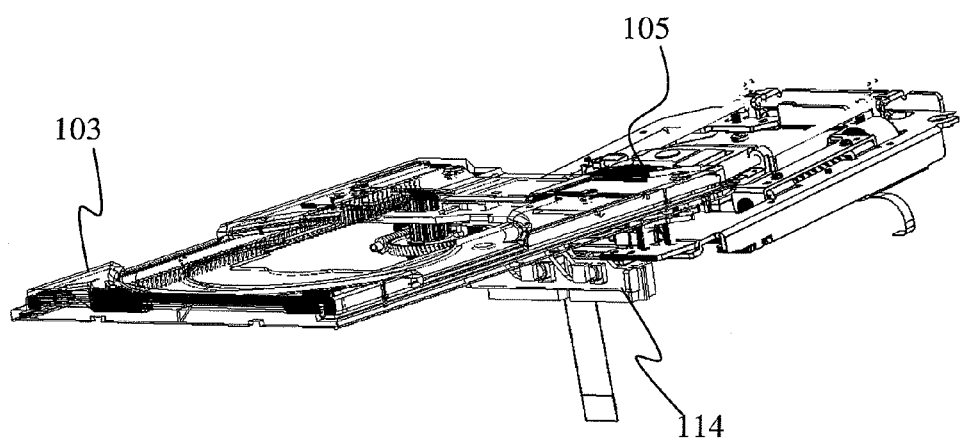
FIG. 5B is a perspective view of the disk device illustrating an unchucking operation.

The chucking and unchucking operations will be described through reference to FIGS. 5A and 5B. FIG. 5A shows a state in which the disk tray 103 is located at the close position and the chucking operation is complete. At this point, the cam slider 114 has moved to the right end with respect to the disk tray 103, and the cam slider 114 lifts up the disk table 105. Then, the optical disk 101 is clamped by the disk table 105 and lifted up to a position where the optical disk 101 can be rotated. FIG. 5B shows a state in which the disk tray 103 is located at the open position and the unchucking operation is complete. At this point, the cam slider 114 has moved to the left end with respect to the disk tray 103, and the cam slider 114 pushes the disk table 105 down to a position where the disk table 105 does not interfere with the unloading operation of the disk tray 103.

A series of control of the loading and unloading operations will be described through reference to FIGS. 6A, 6B and 7.

Figures 6A, 6B:
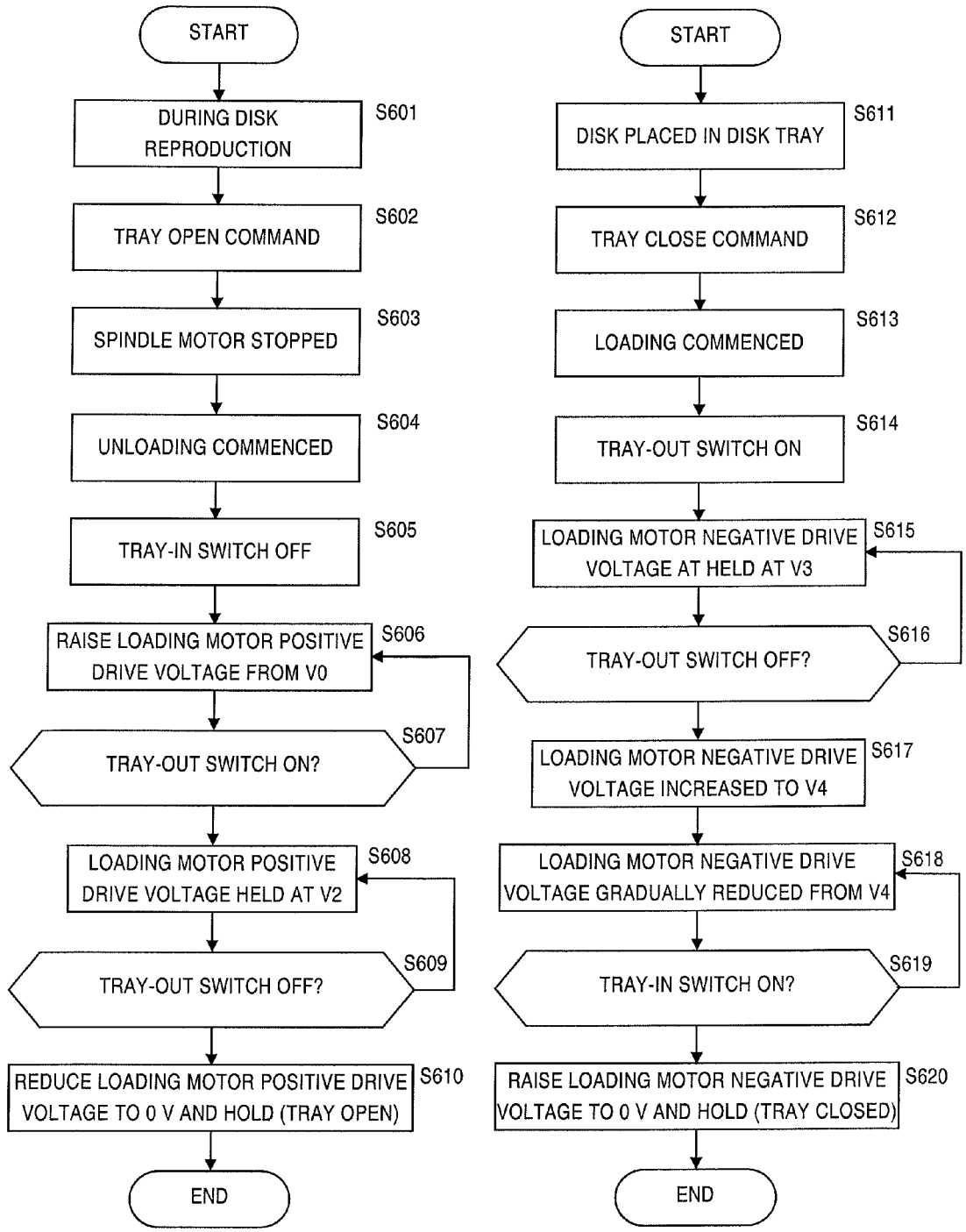
FIG. 6A is a flowchart illustrating an unloading operation of the disk device illustrated in FIG. 1.
FIG. 6B is a flowchart illustrating a loading operation of the disk device illustrated in FIG. 1.
Figure 7:
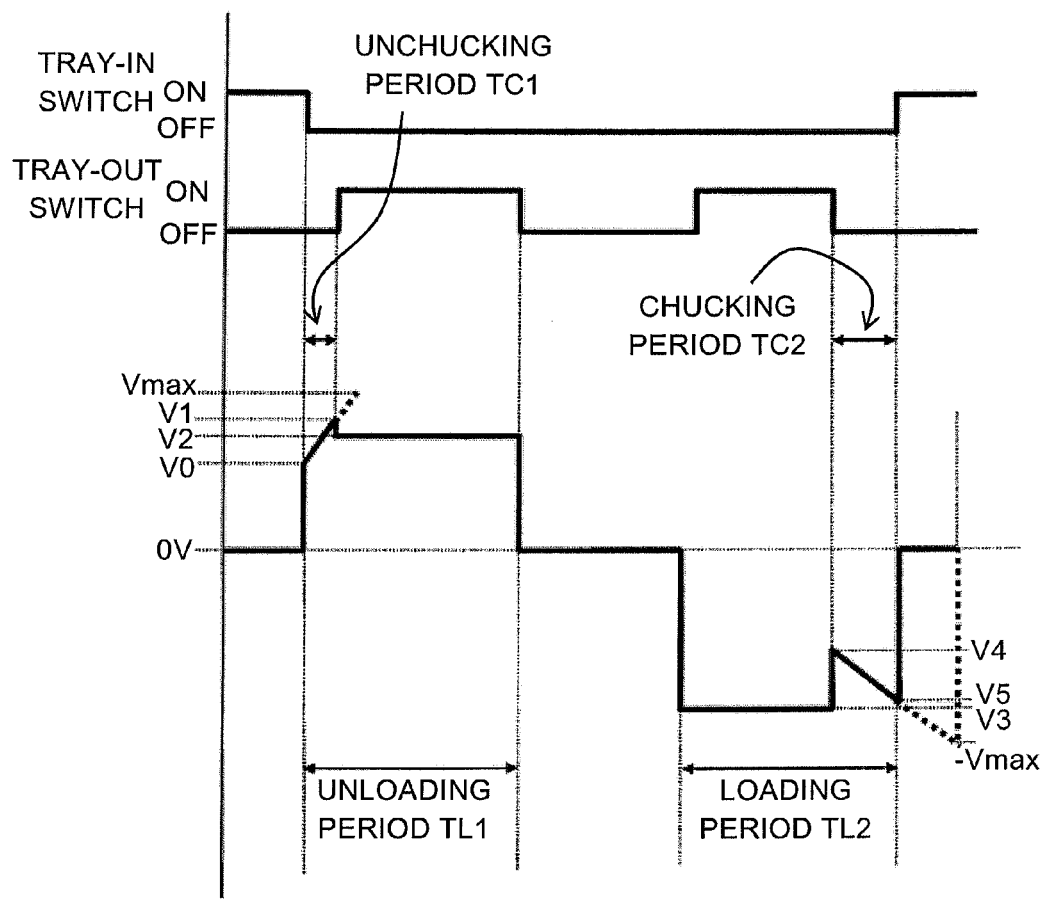
FIG. 7 is a diagram illustrating a drive voltage of the disk device illustrated in FIG. 1.

First, as shown in FIG. 6A, the unloading operation performed during disk reproduction (step S601) will be described. When the tray open command is received (step S602), the spindle motor 111 is stopped (step S603) by the command from the control section 121. Then, the unloading operation is commenced (step S604), and the tray-in switch 117 is switched off (step S605). At this instant, the positive drive voltage is raised gradually from a first initial voltage V0 as shown in FIG. 7, with the upper limit target value being a loading motor permissible positive voltage Vmax (step S606). Next, the increase of the positive drive voltage is continued until the tray-out switch 115 is switched on (step S607). When the tray-out switch 115 is switched on, the increase of the positive drive voltage is stopped. Then, the positive drive voltage V1 at this point is reduced to the first predetermined positive drive voltage V2, and held at the first predetermined positive drive voltage V2 (step S608). The drive voltage is held at the first predetermined positive drive voltage V2 until the tray-out switch 115 is switched off (step S609). As shown in FIG. 7, a period TC1 from when the tray-in switch 117 is switched off until the tray-out switch 115 is switched on is a period of the unchucking operation.

Next, when the tray-out switch 115 is off, the positive drive voltage is reduced to 0 V (step S610) and the unloading operation is complete. In FIG. 7, a period TL1 from when the tray-in switch 117 is switched off and the tray-out switch 115 is switched on, until the tray-out switch 115 is switched off the next time is a period of the unloading operation.

The loading operation as shown in FIG. 6B will now be described. When the optical disk 101 is placed in the disk tray 103 located at the open position (step S611) and the tray close command is received (step S612), the loading operation is commenced (step S613) and the second predetermined negative drive voltage V3 is applied to the loading motor 107. When the tray-out switch 115 is switched on (step S614), the negative drive voltage is held to the second predetermined voltage V3 (step S615). Then, the control section 121 monitors whether or not the tray-out switch 115 is switched off (step S616). When the tray-out switch 115 has been switched off, the negative drive voltage is raised slightly and set to a second initial voltage V4 (step S617). The negative drive voltage is then gradually reduced using the loading motor permissible negative voltage −Vmax as a lower limit target value, and the chucking operation is commenced (step S618). The reason for raising the negative drive voltage to the second initial voltage V4 from the second predetermined negative drive voltage V3 is that if the chucking operation is commenced with the second predetermined negative drive voltage V3, then the torque of the loading motor 107 will be too high for the chucking operation, and noise generated during the chucking operation will be too high. Therefore, the negative drive voltage is raised to the second initial voltage V4 to lower the torque. Next, the control section 121 monitors whether or not the tray-in switch 117 is on (step S619). The negative drive voltage is reduced from the second initial voltage V4 until the control section 121 monitors that the tray-in switch 117 is switched on. Once the tray-in switch 117 is on, the negative drive voltage V5 at this time is raised to 0 V, and the loading operation is complete with the negative drive voltage being held at 0 V. In FIG. 7, a period TL2 from when the tray-out switch 115 is switched on (or when the tray close command is received) and then the tray-in switch 117 is switched on is the loading period. Furthermore, a period TC2 from when the tray-out switch 115 is switched off until the tray-in switch 117 is switched on is the chucking period.

The drive voltages V0 to V5 is set as follows: V0=1.0 V, V1=4.5 V, V2=3.3 V, V3=−3.3 V, V4=−1.0 V, V5=−3.0 V. Furthermore, the loading motor permissible positive voltage Vmax and the loading motor permissible negative voltage −Vmax are set to 6.0 V and −6.0 V, respectively. These are just examples, though, and suitable values are preferably set according to the permissible voltage of the loading motor 107 being used, or according to the load of the disk device itself.

Figure 8A:
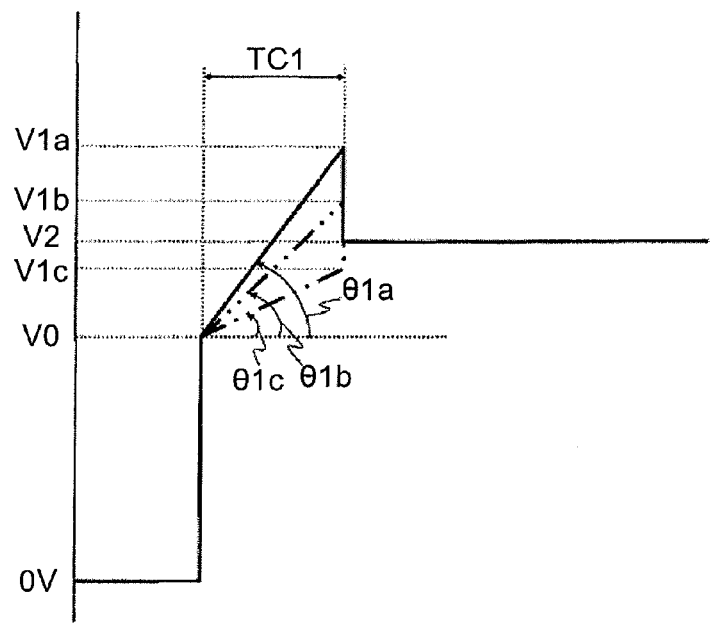
FIG. 8A is a detail diagram illustrating the drive voltage during an unchucking period.

FIG. 8A shows a detail wave form of the positive drive voltage during the unchucking period TC1. The positive drive voltages V1$a$, V1$b$ and V1$c$ are voltages reached when the tray-out switch 115 is switched on if the first initial voltage V0 at the start of the unchucking operation is raised at different rates, respectively. The rise angles are termed θ1$a$, θ1$b$ and θ1$c$, respectively. If the rise angle of the positive drive voltage is increased (as with θ1$a$), then the torque is also high in the unchucking operation. Thus, even if the unchucking period TC1 is shortened, it will still be possible to complete the unchucking operation reliably within the unchucking period TC1. However, since the torque is higher, the unchucking operation will tend to be noisier.

If the rise angle of the loading drive motor voltage is decreased (as with θ1$c$), then the torque will be lower. Thus, there will be less noise in the unchucking operation. However, because the torque is low, the unchucking period TC1 will last longer. As a result, the unloading operation including the unchucking operation will take more time.

Figure 8B:
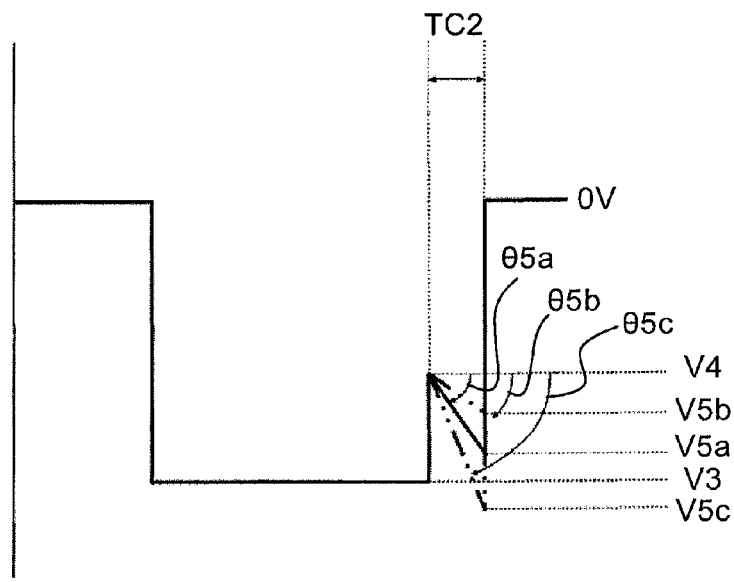
FIG. 8B is a detail diagram illustrating the drive voltage during a chucking period.

FIG. 8B shows a detail wave form of the negative drive voltage during the chucking period TC2. The negative drive voltages V5$a$, V5$b$ and V5$c$ are voltages reached when the tray-in switch 117 is switched on if the second initial voltage V4 at the start of the chucking operation is reduced at different rates, respectively. The fall angles are termed θ5$a$, θ5$b$ and θ5$c$, respectively. If the fall angle of the negative drive voltage is increased (as with θ5$b$), then the torque is also high in the chucking operation. Thus, even if the chucking period TC2 is shortened, it will still be possible to complete the chucking operation reliably within the chucking period TC2. However, since the torque is higher, the chucking operation will tend to be noisier.

Furthermore, if the fall angle of the negative drive voltage is decreased (as with θ5$c$), then the torque will be lower. Thus, there will be less noise during the chucking operation. However, because the torque is low, the chucking period TC2 will last longer. As a result, the loading operation including the chucking operation will take more time.

As discussed above, the rise angle of the positive drive voltage during the unloading operation and the fall angle of the negative drive voltage during the chucking operation can be set after taking into account speed and noise of the chucking and unchucking operations. Specifically, the design will preferably take into account the balance between operating speed as operation compensation and quietness as operation quality, in order to compensate the variation in load generated by variance of components of the device, or in the loading operation load originally had by the drive device.

With the drive device, the drive voltage during the chucking and unchucking operations is gradually varied. The voltage change is continued from the start until the completion of the chucking and unchucking operations that are detected by the tray-in switch 117 and tray-out switch 115. Thus, the chucking and unchucking operations can be carried out slowly, which reduces the operating noise. Furthermore, the chucking operation is stably complete even if the high loads are encountered when the loading operation and the chucking operation are performed at the same time.

Since the torque of the loading motor 107 is raised gradually during the chucking and unchucking operations, the chucking and unchucking operations can be carried out reliably. Furthermore, a low-torque loading motor can be employed to the disk device, which lowers the cost, weight, and power consumption of the disk device.

With the disk device, the lever switch 301 is provided, which makes it possible to carry out the switching operation more reliably by transmitting the pressing force of the rib more reliably to the tray-out switch.

The present invention can be applied to disk devices that make use of optical disks or other such disk recording medium. More specifically, the present invention is well suited to disk devices that make use of a disk recording medium and having a disk tray loading and unloading function.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a disk device equipped with the present invention. Accordingly, these terms, as utilized to describe the present invention should be interpreted relative to a disk device equipped with the present invention as used in the normal operating position.

While a preferred embodiment has been chosen to illustrate the present invention, it will be apparent to those skilled in the art from this disclosure that various changes and modifications can be made herein without departing from the scope of the invention as defined in the appended claims. Furthermore, the foregoing description of the preferred embodiment according to the present invention is provided for illustration only, and not for the purpose of limiting the invention as defined by the appended claims and their equivalents.

What is claimed is:
1. A disk device comprising:
a disk tray on which a disk recording medium is placed;

a spindle motor configured to rotate the disk recording medium together with a disk table on which the disk recording medium is chucked;

a chucking section configured to selectively chuck and unchuck the disk recording medium with respect to the disk table;

a loading motor configured to move the disk tray between an eject position and a retract position and move the chucking section between a chucking position and an unchucking position;

a tray-in switch configured to detect whether or not the disk tray is located at the retract position;

a tray-out switch configured to detect whether or not the disk tray is located at a predetermined range between the eject position and the retract position; and a loading motor drive voltage generating section configured to generate a drive voltage for the loading motor so that a torque of the loading motor is decreased in response to the tray-out switch detecting that the disk tray is not located at the predetermined range between the eject position and the retract position, and then the torque of the loading motor is gradually increased after the tray-out switch detects that the disk tray is not located at the predetermined range between the eject position and the retract position until the tray-in switch detects that the disk tray is located at the retract position.

2. The disk device according to claim 1, wherein
the loading motor drive voltage generating section is further configured to generate the drive voltage for the loading motor so that the torque of the loading motor is gradually increased after the tray-in switch detects that the disk tray is not located at the retract position until the tray-out switch detects that the disk tray is located at the predetermined range between the eject position and the retract position.

3. The disk device according to claim 1, further comprising a cam slider configured and arranged to mesh with the loading motor and engage to a part of the chucking section to move the chucking section between the chucking position and the unchucking position by being driven by the loading motor.

4. The disk device according to claim 1, wherein
the disk tray includes a rib provided along a side edge of the disk tray parallel to a direction from the retract position of the disk tray to the eject position of the disk tray, the rib being configured and arranged to press the tray-out switch to turn on the tray-out switch when the disk tray is located at the predetermined range between the eject position and the retract position.

5. The disk device according to claim 4 wherein
the rib is further configured and arranged to press the tray-out switch via a lever switch provided between the rib and the tray-out switch.

6. A disk device comprising:
a disk tray on which a disk recording medium is placed;
a spindle motor configured to rotate the disk recording medium together with a disk table on which the disk recording medium is chucked;

a chucking section configured to selectively chuck and unchuck the disk recording medium with respect to the disk table;

a loading motor configured to move the disk tray between an eject position and a retract position and move the chucking section between a chucking position and an unchucking position;

a tray-in switch configured to detect whether or not the disk tray is located at the retract position;

a tray-out switch configured to detect whether or not the disk tray is located at a predetermined range between the eject position and the retract position; and a loading motor drive voltage generating section configured to generate a drive voltage for the loading motor so that a torque of the loading motor is gradually increased after the tray-out switch detects that the disk tray is not located at the predetermined range between the eject position and the retract position until the tray-in switch detects that the disk tray is located at the retract position, the loading motor drive voltage generating section being further configured to generate the drive voltage for the loading motor so that the torque of the loading motor is maintained at a first predetermined value after a retraction of the disk tray is commenced from the eject position until the tray-out switch detects that the disk tray is not located at the predetermined range between the eject position and the retract position in succession to detecting that the disk tray is located at the predetermined range between the eject position and the retract position.

7. The disk device according to claim 6, wherein
the loading motor drive voltage generating section is further configured to generate the drive voltage for the loading motor so that the torque of the loading motor is gradually increased from a second predetermined value that is smaller than the first predetermined value.

8. The disk device according to claim 7, wherein
the loading motor is further configured to complete a movement of the chucking section from the unchucking position to the chucking position by the time when the tray-in switch detects that the disk tray is located at the retract position after the tray-out switch detects that the disk tray is not located at the predetermined range between the eject position and the retract position.

9. A disk device comprising:
a disk tray on which a disk recording medium is placed;
a spindle motor configured to rotate the disk recording medium together with a disk table on which the disk recording medium is chucked;

a chucking section configured to selectively chuck and unchuck the disk recording medium with respect to the disk table;

a loading motor configured to move the disk tray between an eject position and a retract position and move the chucking section between a chucking position and an unchucking position;

a tray-in switch configured to detect whether or not the disk tray is located at the retract position;

a tray-out switch configured to detect whether or not the disk tray is located at a predetermined range between the eject position and the retract position; and a loading motor drive voltage generating section configured to generate a drive voltage for the loading motor so that a torque of the loading motor is gradually increased after the tray-out switch detects that the disk tray is not located at the predetermined range between the eject position and the retract position until the tray-in switch detects that the disk tray is located at the retract position, the loading motor drive voltage generating section being further configured to generate the drive voltage for the loading motor so that the torque of the loading motor is gradually increased after the tray-in switch detects that the disk tray is not located at the retract position until the tray-out switch detects that the disk tray is located at the predetermined range between the eject position and the retract position, the loading motor drive voltage generating section being further configured to generate the drive voltage for the loading motor so that the torque of the loading motor is maintained at a third predetermined value after the tray-out switch detects that the disk tray is located at the predetermined range between the eject position and the retract position until the tray-out switch detects that the disk tray is not located at the predetermined range between the eject position and the retract position.

10. The disk device according to claim 9, wherein the loading motor is further configured to complete a movement of the chucking section from the chucking position to the unchucking position by the time when the tray-out switch detects that the disk tray is located at the predetermined range between the eject position and the retract position after an ejection of the disk tray is commenced from the retract position.

11. A disk device comprising:
a disk tray on which a disk recording medium is placed;
a spindle motor configured to rotate the disk recording medium together with a disk table on which the disk recording medium is chucked;
a chucking section configured to selectively chuck and unchuck the disk recording medium with respect to the disk table;
a loading motor configured to move the disk tray between an eject position and a retract position and move the chucking section between a chucking position and an unchucking position;
a tray-in switch configured to detect whether or not the disk tray is located at the retract position;
a tray-out switch configured to detect whether or not the disk tray is located at a predetermined range between the eject position and the retract position;
a loading motor drive voltage generating section configured to generate a drive voltage for the loading motor so that a torque of the loading motor is gradually increased after the tray-out switch detects that the disk tray is not located at the predetermined range between the eject position and the retract position until the tray-in switch detects that the disk tray is located at the retract position, and
a cam slider configured and arranged to mesh with the loading motor and engage to a part of the chucking section to move the chucking section between the chucking position and the unchucking position by being driven by the loading motor,
the cam slider being further configured and arranged to press the tray-in switch to turn on the tray-in switch when the disk tray is located at the retract position.

12. The disk device according to claim 11, wherein the cam slider is configured and arranged to release the tray-in switch to turn off the tray-in switch when the disk tray moves from the retract position toward the eject position.

13. A disk device according to claim 11, wherein comprising:
a disk tray on which a disk recording medium is placed;
a spindle motor configured to rotate the disk recording medium together with a disk table on which the disk recording medium is chucked;
a chucking section configured to selectively chuck and unchuck the disk recording medium with respect to the disk table;
a loading motor configured to move the disk tray between an eject position and a retract position and move the chucking section between a chucking position and an unchucking position;
a tray-in switch configured to detect whether or not the disk tray is located at the retract position;
a tray-out switch configured to detect whether or not the disk tray is located at a predetermined range between the eject position and the retract position; and
a loading motor drive voltage generating section configured to generate a drive voltage for the loading motor so that a torque of the loading motor is gradually increased after the tray-out switch detects that the disk tray is not located at the predetermined range between the eject position and the retract position until the tray-in switch detects that the disk tray is located at the retract position,
the disk tray including a rib provided along a side edge of the disk tray parallel to a direction from the retract position of the disk tray to the eject position of the disk tray, the rib being configured and arranged to press the tray-out switch to turn on the tray-out switch when the disk tray is located at the predetermined range between the eject position and the retract position,
the rib being further configured and arranged to release the tray-out switch to turn off the tray-out switch during a certain period after the ejection of the disk tray is commenced from the retract position, and release the tray-out switch to turn off the tray-out switch during a certain period before the ejection of the disk tray is completed.

* * * * *